(12) United States Patent
Mukherjee

(10) Patent No.: US 8,627,039 B2
(45) Date of Patent: Jan. 7, 2014

(54) EFFECTIVE MEMORY CLUSTERING TO MINIMIZE PAGE FAULT AND OPTIMIZE MEMORY UTILIZATION

(75) Inventor: Maharaj Mukherjee, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 13/292,256

(22) Filed: Nov. 9, 2011

(65) Prior Publication Data

US 2012/0060013 A1    Mar. 8, 2012

Related U.S. Application Data

(63) Continuation-in-part of application No. 12/421,879, filed on Apr. 10, 2009, now Pat. No. 8,078,826.

(51) Int. Cl.
  *G06F 12/00* (2006.01)
(52) U.S. Cl.
  USPC ............... 711/203; 711/3; 711/136; 711/160
(58) Field of Classification Search
  USPC ..................... 711/203, 136, 160, 3
  See application file for complete search history.

(56) References Cited

U.S. PATENT DOCUMENTS

| 6,094,715 | A | 7/2000 | Wilkinson et al. | |
|---|---|---|---|---|
| 7,389,399 | B2 * | 6/2008 | Terrell et al. | 711/203 |
| 7,424,592 | B1 * | 9/2008 | Karr et al. | 711/203 |
| 2004/0162952 | A1 | 8/2004 | Feind et al. | |

OTHER PUBLICATIONS

Shacham, et al., On the Effectiveness of Address-Space Randomization, CCS '04, Oct. 25-29, 2004, Washington, DC, USA, pp. 298-307.

Azimi, et al., PATH: Page Access Tracking to Improve Memory Management, ISMM '07, Oct. 21-22, 2007, Montreal, Quebec, Canada, pp. 31-42.

Manassiev, et al., Exploiting Distributed Version Concurrency in a Transactional Memory Cluster, PPoPP '06, Mar. 29-31, 2006, New York, New York, USA, pp. 198-208.

* cited by examiner

*Primary Examiner* — Son Dinh
(74) *Attorney, Agent, or Firm* — Cahn & Samuels, LLP

(57) ABSTRACT

An embodiment of the invention provides a method for organizing data addresses within a virtual address space to reduce the number of data fetches to a cloud computing environment. More specifically, data access requests to the cloud computing environment are monitored to identifying data addresses having similar properties. Multi-dimensional clusters are created based on the monitoring to group the data addresses having similar properties. A memory page is created from a multi-dimensional cluster, wherein the creating of the memory page includes creating a cross-sectional partition from the multi-dimensional cluster. The multi-dimensional clusters and the memory page are stored in the cloud computing environment. A request for a data object in the cloud computing environment is received from a user interface. The data address corresponding to the data object is identified and mapped to the multi-dimensional cluster and/or the memory page. The memory page is transferred to the user interface.

25 Claims, 15 Drawing Sheets

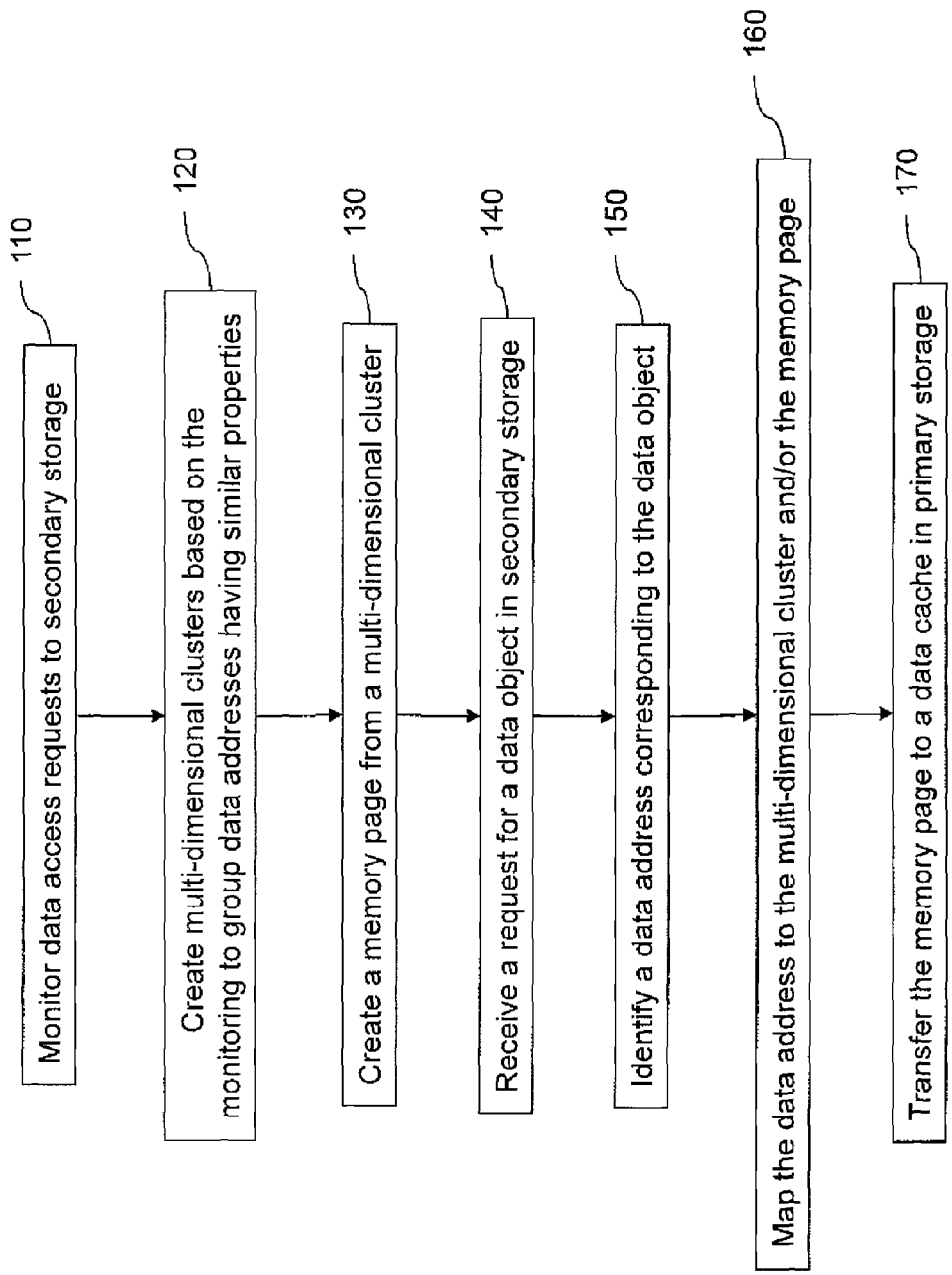

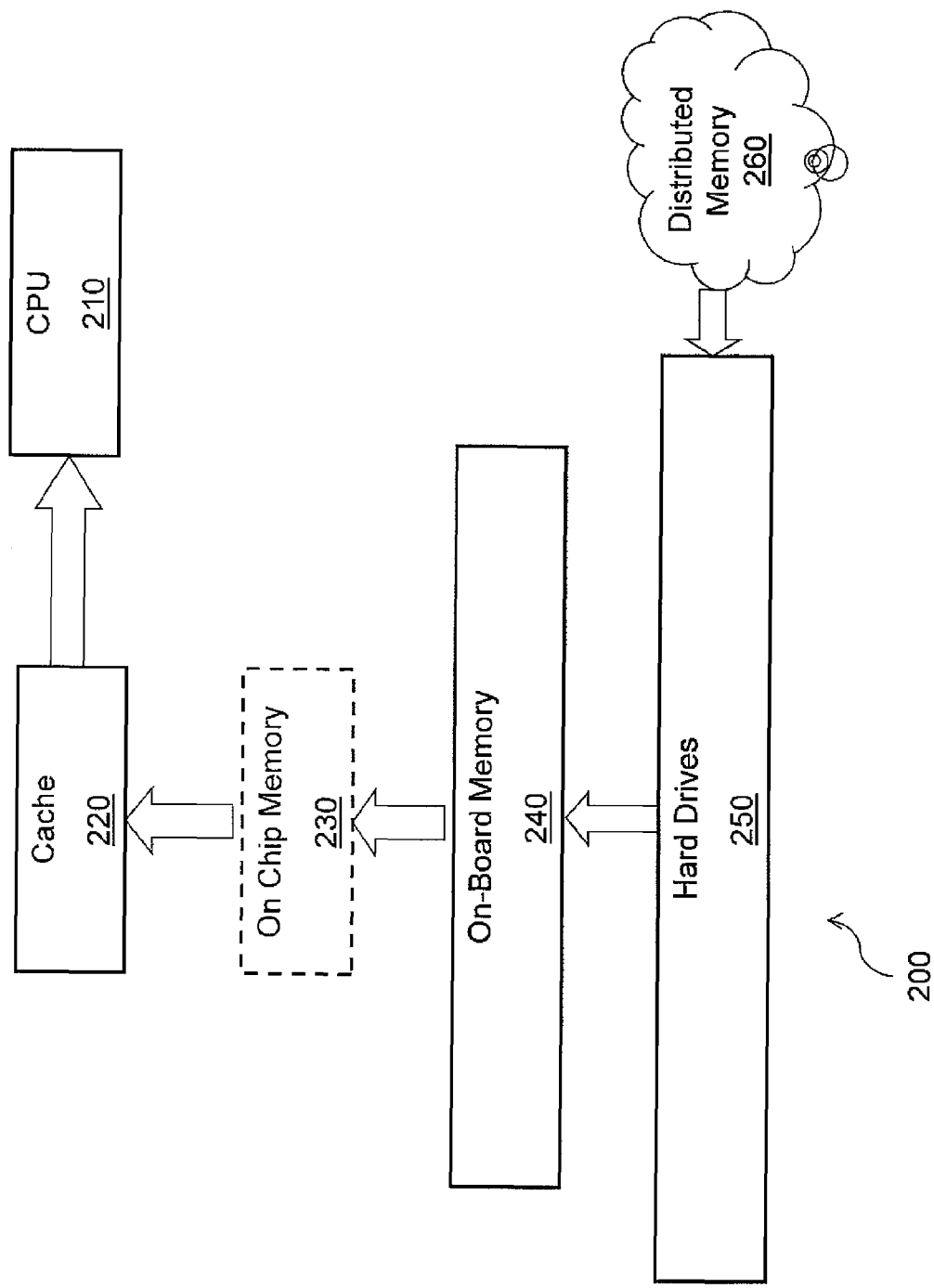

EFFECTIVE MEMORY CLUSTERING TO MINIMIZE PAGE FAULT AND OPTIMIZE MEMORY UTILIZATION

The present application is a Continuation-In-Part patent application of U.S. Ser. No. 12/421,879 filed Apr. 10, 2009, the entirety of which is incorporated herein by reference.

BACKGROUND

The present invention is in the field of systems, methods, and computer program products for effective memory clustering to minimize page faults and optimize memory utilization. The present invention is applicable in the field of distributed storage as well as storage associated with cloud computing.

When a request for data is received by the CPU, all of the pages available in the cache are searched. If the requested data is not available, the next lower level of the memory hierarchy is searched until the page containing the data is located. The page containing the requested data is then fetched and stored at each hierarchy level up to the cache. If the cache or any memory level in the hierarchy is full, the recently obtained page replaces an existing page. The CPU then accesses the data from the cache.

In many applications involving multidimensional data, the memory associativity includes more than row and column associativity. Examples of such applications include large data mining applications in multidimensional data space. Applications running on a multi-threaded, multi-process, and/or multi-core system may also have memory associativity in addition to row and column associativity. Data paging involving only row or column association may pull in only a small subset of data up and down the memory hierarchy. This may lead numerous page faults and slower computer processing.

SUMMARY OF THE INVENTION

An embodiment of the invention provides a system and method for organizing data addresses within a virtual address space to reduce the number of data fetches to a cloud computing environment. More specifically, an analyzer module monitors data access requests to the cloud computing environment, the monitoring including identifying data addresses in the cloud computing environment having similar properties. A processor module connected to the analyzer module creates multi-dimensional clusters based on the monitoring to group the data addresses having similar properties. The processor module also creates a memory page from a multi-dimensional cluster of the multi-dimensional clusters, wherein the creating of the memory page includes creating a cross-sectional partition from the multi-dimensional cluster. The multi-dimensional clusters and the memory page are stored in the cloud computing environment.

A request from a user interface connected to the processor module is received, wherein the request includes a request for a data object in the cloud computing environment. A mapping module connected to the processor module identifies the data address corresponding to the data object and maps the data address to the multi-dimensional cluster and/or the memory page. The processor module transfers the memory page to the user interface.

BRIEF DESCRIPTION OF THE SEVERAL VIEWS OF THE DRAWINGS

The present invention is described with reference to the accompanying drawings. In the drawings, like reference numbers indicate identical or functionally similar elements.

FIG. 1 illustrates a flow diagram of a method for effective memory clustering to minimize page faults and optimize memory utilization according to an embodiment of the invention;

FIG. 2 illustrates a memory hierarchy scheme according to an embodiment of the invention;

DETAILED DESCRIPTION

Figure 4:
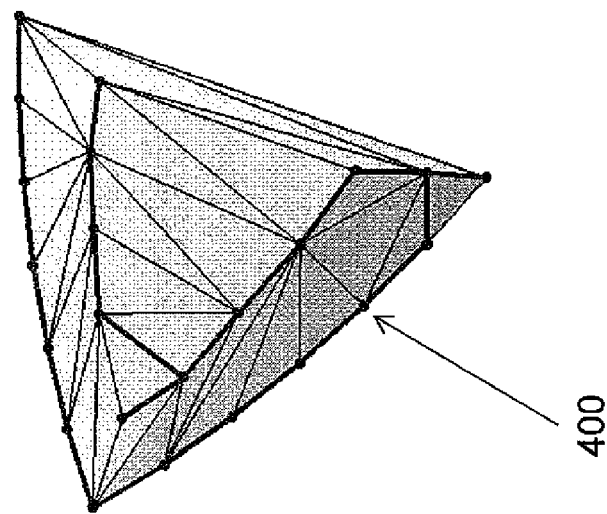
FIG. 4 illustrates a cluster according to another embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

FIG. 1 provides a general overview of one method for memory utilization according to an embodiment of the invention. Details of this and other embodiments of the invention are described below with reference to FIGS. 2-11. A method 100 monitors data access requests to secondary storage and identifies data addresses in secondary storage having similar properties (110). Multi-dimensional clusters are created based on the monitoring to group the data addresses having similar properties (120). A memory page is created from a multi-dimensional cluster, wherein a cross-sectional partition is created (sliced) from the multi-dimensional cluster (130). The method 100 receives a request for a data object in secondary storage (140) and identifies a data address corresponding to the requested data object (150). The data address is mapped to the multi-dimensional cluster and/or the memory page (160); and, the memory page is transferred to a data cache in primary storage (170).

FIG. 2 illustrates a memory hierarchy scheme 200 including a CPU 210 and primary storage units (cache 220, on-chip memory 230, and on-board memory 240 (e.g., RAM)). The memory hierarchy scheme 200 also includes secondary storage units (hard drives 250 and distributed memory 260 (e.g., server-based, cloud-based)). The speed of memory access by the CPU 210 increases up the memory hierarchy scheme 200; and, the unit cost decreases down the memory hierarchy scheme 200. The process of transferring data from secondary storage to primary storage is referred to as "paging". Virtual memory schemes use paging to store data that does not fit into physical RAM.

Figure 3:
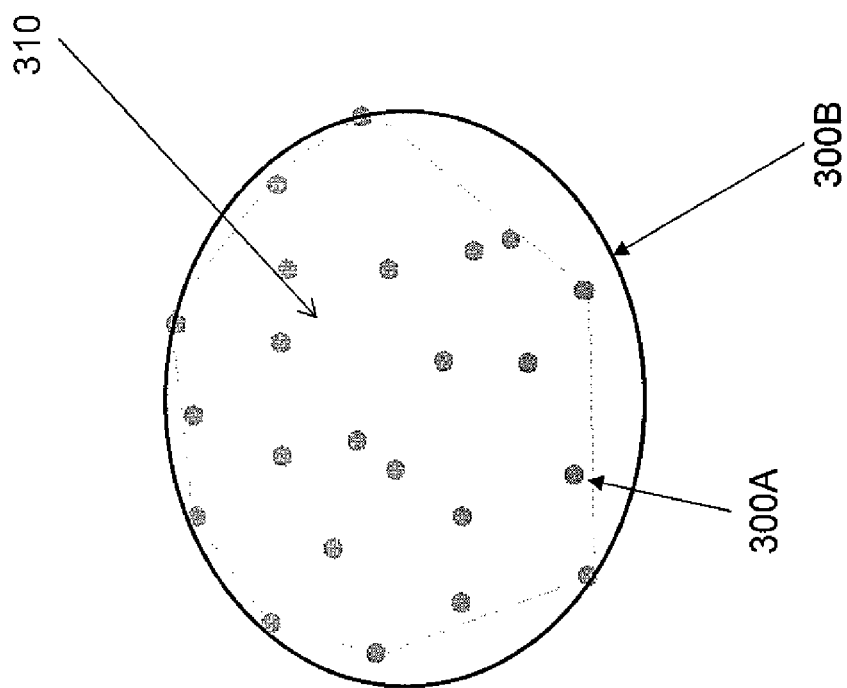
FIG. 3 illustrates a cluster according to an embodiment of the invention.

FIG. 3 illustrates clusters 300A and 300B of data addresses 310 according to an embodiment of the invention. Each data address 310 corresponds to a data object in secondary storage (e.g., a first hard drive and a second hard drive). The clusters 300A, 300B are created based on monitored data access requests to secondary storage, wherein data addresses 310 having similar properties (e.g., location, access frequency, relationships with other data addresses) are grouped together. In at least one embodiment of the invention, clusters are updated to reflect changes in data access patterns. Specifically, the data addresses 310 are un-clustered, and subsequently re-clustered based on updated monitoring of the data access requests.

In at least one embodiment of the invention, clustering of the data addresses 310 is performed using distance metrics, for example, the L1 metric or the Manhattan distance, the L2 metric or Euclidean, or the $L_{infinity}$ or the Maximum metric. FIG. 3 illustrates two clusters of the same data addresses: a two-dimensional convex hull cluster 300A and an ellipsoid cluster 300B. FIG. 4 illustrates a three-dimensional convex hull cluster 400 (also referred to as a gift wrapper or polyhedron cluster). The three-dimensional convex hull cluster 400 includes the tightest (i.e., most closely related) grouping of data addresses 310; the grouping in the ellipsoid cluster 300B is less tight.

In one embodiment of the invention, the clusters are created by identifying one or more orthogonal bounding boxes that enclose the data addresses 310. The clustering of the data addresses 310 does not have to be exact. An appropriate approximation of the two-dimensional convex hull cluster 300A, the ellipsoid cluster 300B, or the three-dimensional convex hull cluster 400 may be used.

At least one embodiment of the invention utilizes inclusion tests to determine whether a data address is located within a cluster. In a two dimensional area, an infinite line is written in the equation: $px+qy=v$, where x and y correspond to the X and Y dimensions, respectively. This line divides the X-Y plane into two halves. Any points on one half satisfies the inequality $px+qy>v$. Points on the other side satisfy the inequality: $px+qy<v$. A convex polygon with n sides is expressed by a set of inequalities of the form $\{(pi)x+(qi)y<(vi), \text{ for } i=1, \ldots, n\}$.

Similarly, in a three-dimensional area, an infinite plane is defined by the equation: $px+qy+ry=n$. This line divides the X-Y-Z three dimensional space into two halves. Any points on one half satisfies the inequality $px+qy+rz>n$. Points on the other side of the plane satisfy the inequality: $px+qy+rz<n$. A convex polyhedron with n surfaces is expressed by a set of inequalities of the form $\{(pi)x+(qi)y<(vi), \text{ for } i=1, \ldots, n\}$.

In a hyperspace with m dimensions $\{x\_j, j=1, \ldots, m\}$, a hyperplane is defined in terms of m dimensions as: $(a1)(x1)+(a2)(x2)+(a3)(x3)+\ldots+(am)(xm)=v$. Any points on one half satisfy the inequality $(a1)(x1)+(a2)(x2)+(a3)(x3)+\ldots+(am)(xm)>v$. Points on the other side satisfy the inequality: $(a1)(x1)+(a2)(x2)+(a3)(x3)+\ldots+(am)(xm)<v$. The above is also written in a Vector Notation: $ax<v$. Where $a=[a1, a2, a3, \ldots, am]$, $x=[x1, x2, x3, \ldots, xm]$, and $v=[v1, v2, v3, \ldots, vm]$. The cluster is therefore represented by a convex polyhedron. Any point that is inside the cluster satisfies the equation $ax<v$.

Similar concepts are applied in the case of an ellipsoid. In two dimensions, an ellipse is defined as $(x-h)^2/a^2+(y-k)^2/b^2=1$. Point (h, k) defines the center of the ellipse; and, a and b define the aspect ratio. Points within the ellipse satisfy the inequality: $(x-h)^2/a^2+(y-k)^2/b^2<1$. In the case of three-dimensional ellipsoids, points within the ellipsoid satisfy the inequality: $(x-h)^2/a^2+(y-k)^2/b^2+(z-g)^2/c^2<1$. In case of an m dimensional hyperspace, points within an ellipsoid satisfy the inequality $(x-x_0)^T M(x-x_0)<d^2$. Here, $x=[x1, x2, \ldots, xm]$ and is an m-dimensional vector; $x_0=[x01, x02, \ldots, x0m]$ and denotes the center of the ellipse; and, $d=[d1, d2, \ldots, dm]$ and denotes the radius of the ellipse. M is a m×m matrix denoting the m-dimensional aspect ratio as well as the orientation of the ellipsoid. A data address is within a three-dimensional convex hull cluster if $ax<v$. Here, $a=[a1, a2, a3, \ldots, am]$; $x=[x1, x2, x3, \ldots, xm]$; and, $v=[v1, v2, v3, \ldots, vm]$.

Although convex hulls of clusters are illustrated in FIGS. 3 and 4, other types of tight clusters can be created. In one embodiment, ellipsoidal or spherical clusters in a D-dimensional space ($D \geq 2$) are used to partition the virtual address space. In another embodiment, clusters are modeled with convex functions, such as the Gaussian function.

Supervised clustering and/or unsupervised clustering are utilized to create clusters. In supervised clustering, the number of clusters is known a-priori. In un-supervised clustering, the number of clusters is not known a-priori. A clustering algorithm decides the best number of clusters based on the distance metric or other specified properties.

Figure 5:
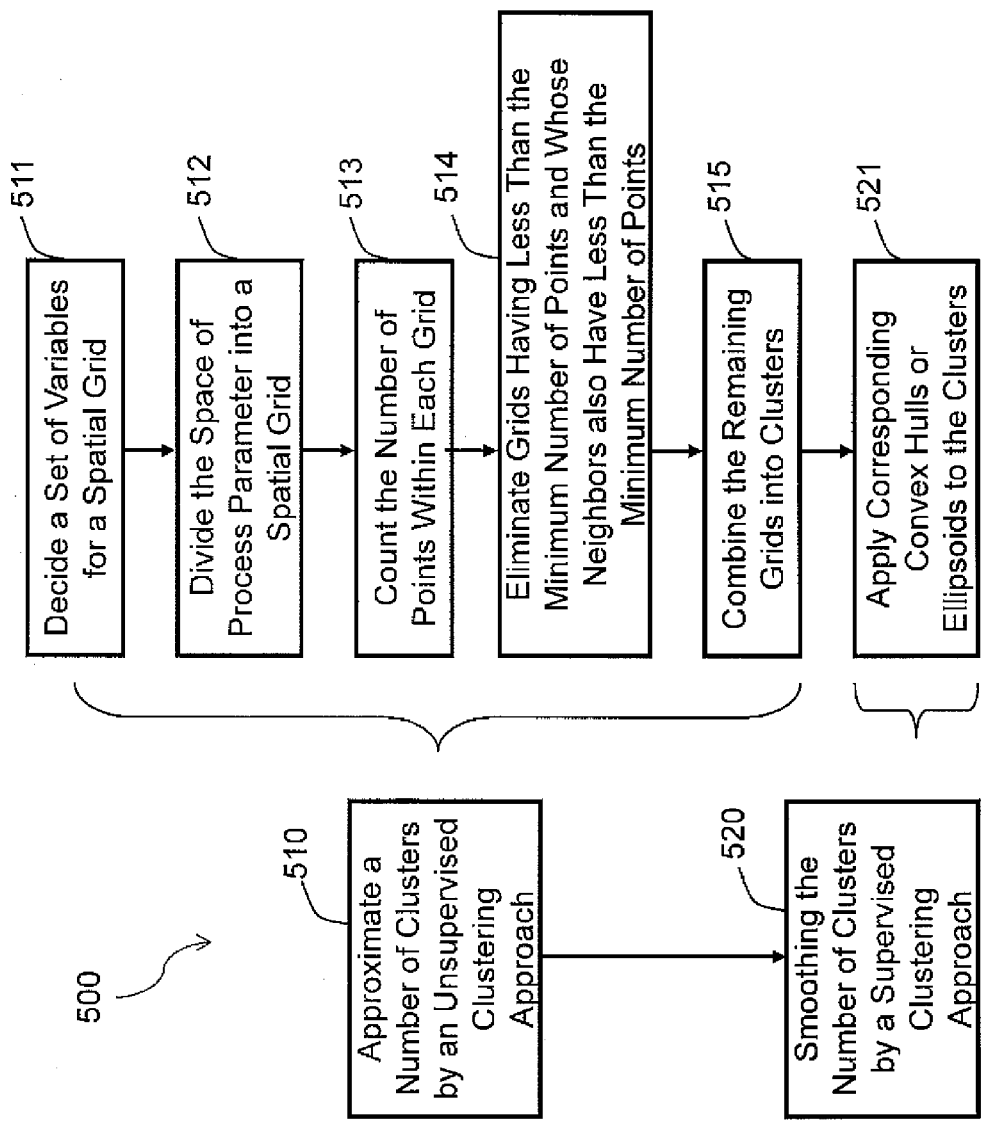
FIG. 5 is a flowchart illustrating a method of clustering according to another embodiment of the invention.

According to one embodiment of the invention, FIG. 5 is a flowchart illustrating a method of clustering based on calibration data. A method 500 approximates a number of clusters by applying an unsupervised clustering approach, e.g., a grid based clustering approach (510). The method 500 then smoothes the number of clusters by applying a supervised clustering approach (520).

By applying an unsupervised clustering approach, the method 500 decides a set of variables for a spatial grid (511). The variables include, among others: a dimensional variable from model calibration with a minimum and maximum value; the number of divisions for each dimension (e.g., a number (e.g., 10) to bin or separate process parameters obtained from model calibration); and, a minimum number of points in a grid (e.g., 0.2% of the total number of data points for a grid to be eliminated). The points may be image parameters or process parameters associated with the calibration data points.

The space of process parameters, in all the given dimensions, is divided into a spatial grid according to the decided division (512). Within each grid block, the number of process parameters or data points is counted (513). If the number of points or process parameters inside a grid is less than the decided minimum number of points and whose neighbors also have points less than the minimum number, the grid block is eliminated (514).

The remaining grid blocks are combined into clusters, where each cluster is separated from its neighbors by eliminated grid blocks (515). The clusters are smoothed by a supervised clustering approach (520). In one embodiment, convex hulls and/or ellipsoids corresponding to the clusters are used to create smoothed tight clusters (521).

Figure 6:
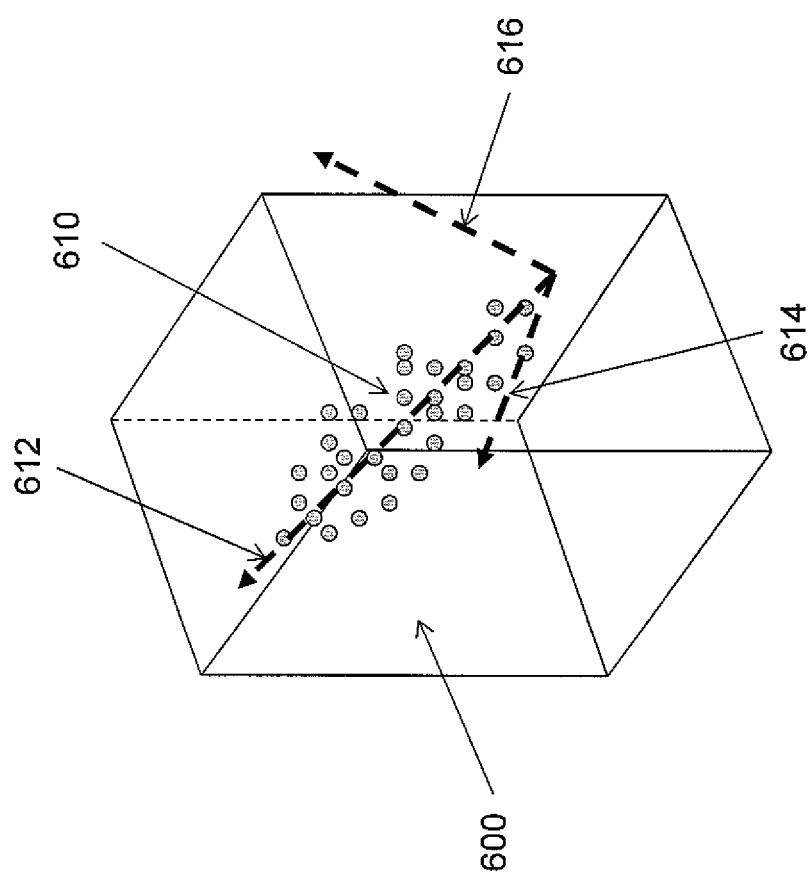
FIG. 6 illustrates a cluster in a virtual address space according to another embodiment of the invention.

FIG. 6 illustrates a three-dimensional cluster 610 in a virtual address space 600. The virtual address space 600 includes physical storage components in both primary storage (e.g., L1 cache, L2 cache, RAM) and secondary storage (e.g., hard drives). The virtual address space 600 extends physical memory size onto secondary storage while giving a software application running on the computer system the impression that it is using contiguous working memory. An embodiment of the invention identifies a major axis 612, a minor axis 614, and a minor axis 616 of the cluster 610. The major axis 612 is the longest diameter of the cluster 610. Thus, the major axis 612 runs through the center of the cluster 610 with its ends being at the widest points of the cluster 610.

More specifically, the major axis is determined by the straight line that connects the two points of the highest curvature of the ellipse. The curvature of a surface is defined by the parametric derivative of the surface, such as ellipsoid. In an m-dimensional ellipsoid defined by $(x-x_0)^T M (x-x_0) < d^2$, the major axis is defined by the first eigenvector of the Matrix M.

Figure 8:
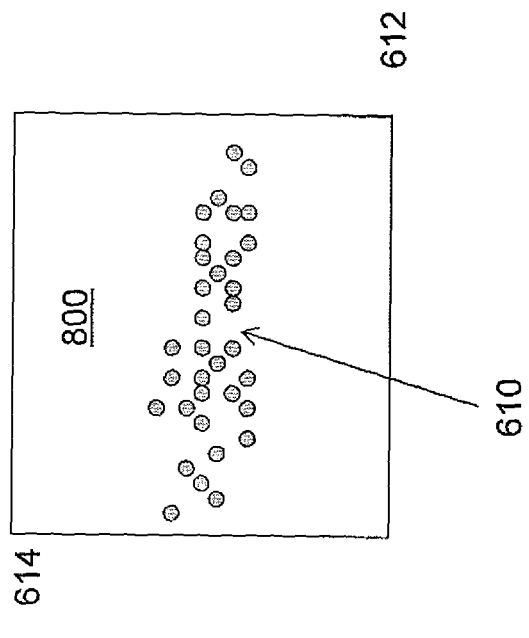
FIG. 8 illustrates a memory page according to an embodiment of the invention.
Figure 7:
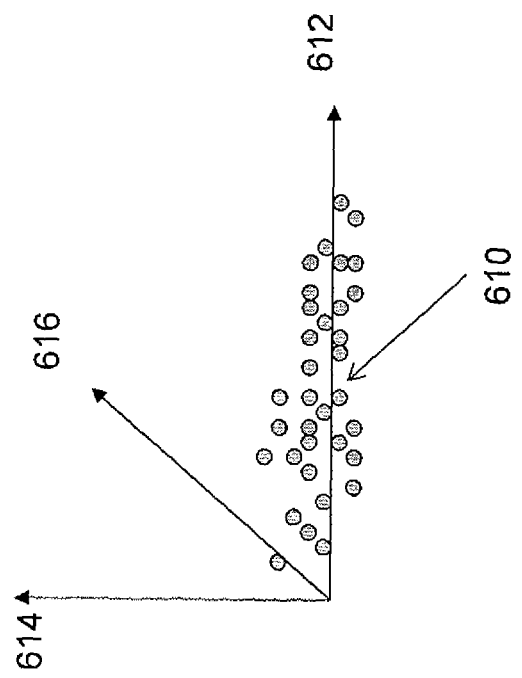
FIG. 7 illustrates the major axis of the cluster in FIG. 6.
Figure 10:
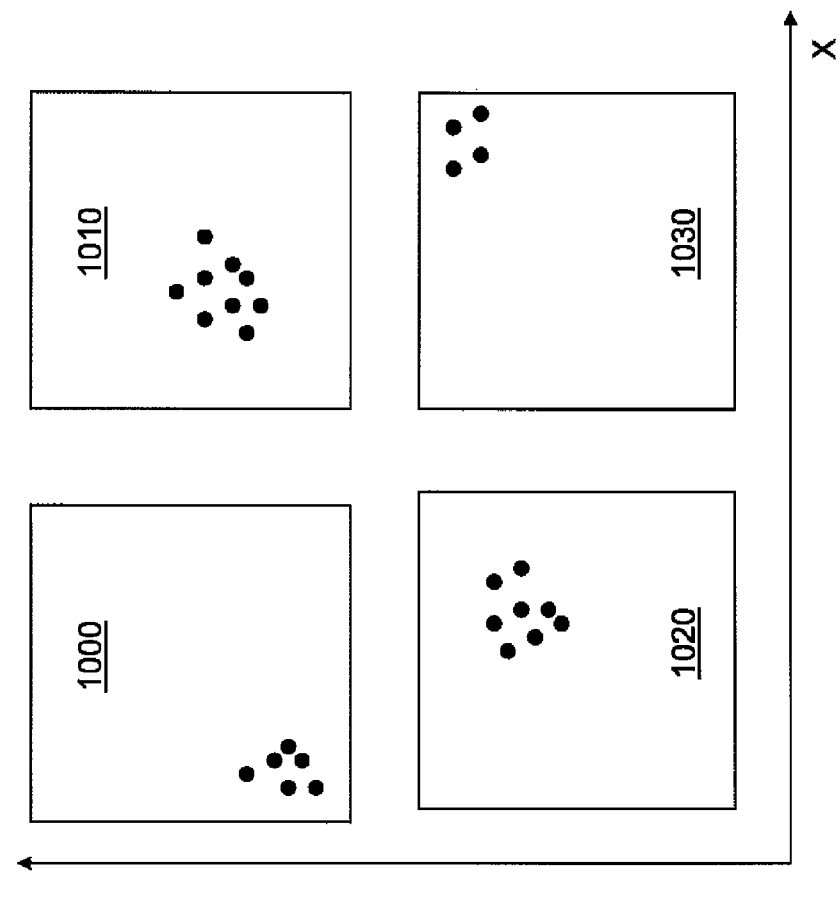
FIG. 10 illustrates memory pages sliced from the cluster illustrated in FIG. 8.

FIG. 7 is a diagram illustrating the cluster 610 reoriented with respect to the major axis 612. Having identified the major axis 612 of the cluster 610, the cluster 610 can be partitioned to maximize the number of data points (e.g., data addresses 610) located within each partition. More specifically, an embodiment of the invention creates one or more two-dimensional memory pages from the cluster by partitioning the cluster along the major axis. As illustrated in FIG. 8, a two-dimensional memory page 800 is created by taking a cross-sectional partition (also referred to as a "slice") of the cluster 610. In order to maximize the number of data addresses 310 in the memory page 800, the partition is parallel to the major axis 612 of the cluster 610. When the memory page 800 is subsequently moved to the cache, as described more fully below, the number of data addresses 310 and corresponding data objects retrieved is maximized.

As described above, if a requested data object cannot be found in the memory cache, each lower storage component in the virtual address space is searched until the requested data object is found. When the requested data object is found, the data address corresponding to the requested data object is identified. The data address is mapped to the cluster and/or the memory page that contains the data address. The memory page is then moved (i.e., fetched) to the cache in primary storage. For example, if the requested data object has a corresponding data address located in the memory page 800, the memory page 800 is copied to the cache and stored in each lower storage component in the virtual address space.

Accordingly, the embodiments of the invention can increase the speed and efficiency of data retrieval from secondary storage. Requests for data typically require more than one data object. As such, multiple data addresses and oftentimes multiple fetches to secondary storage are required to fulfill a data access request. The embodiments herein partition the cluster along the major axis to maximize the number of data addresses located within each memory page. Thus, fewer memory pages, and consequently fewer fetches to secondary storage may be required to satisfy a data access request.

Figure 9:
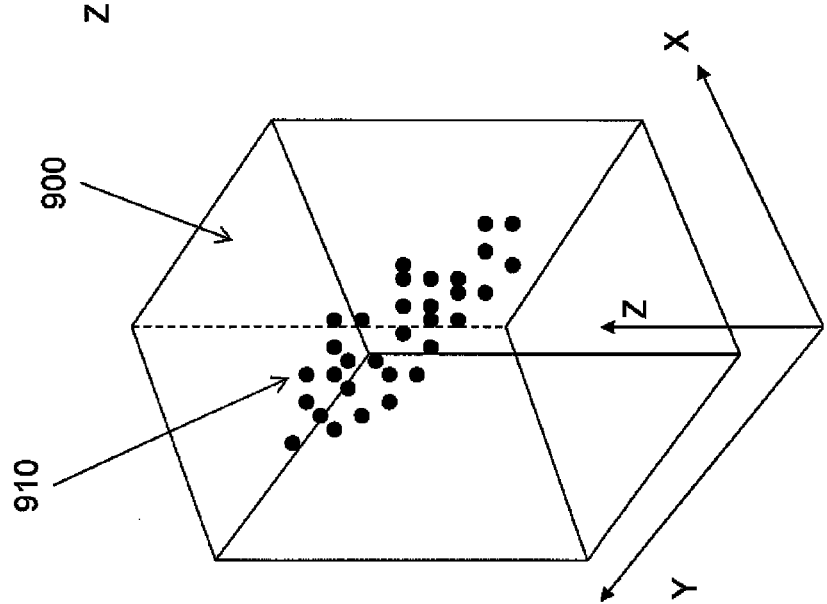
FIG. 9 illustrates a cluster in a virtual address space according to another embodiment of the invention.

For example, FIG. 9 illustrates a three-dimensional cluster 910 in a virtual address space 900. As further illustrated in FIG. 10, memory pages 1000, 1010, 1020, and 1030 are created from partitions that are "sliced" along the X-Z axis of the virtual address space 900. The partitions are not parallel to the major axis of the cluster 910. A combined total of 27 data addresses are retrieved from the four memory pages (i.e., memory pages 1000, 1010, 1020, and 1030). Conversely, as illustrated in FIG. 8, an embodiment of the invention retrieves the memory page 800, which is created from a partition taken along the major axis of the cluster 610. The single memory page 800 includes 34 data addresses, whereas the four memory pages in FIG. 10 include a combined total of only 27 data addresses.

Figure 11:
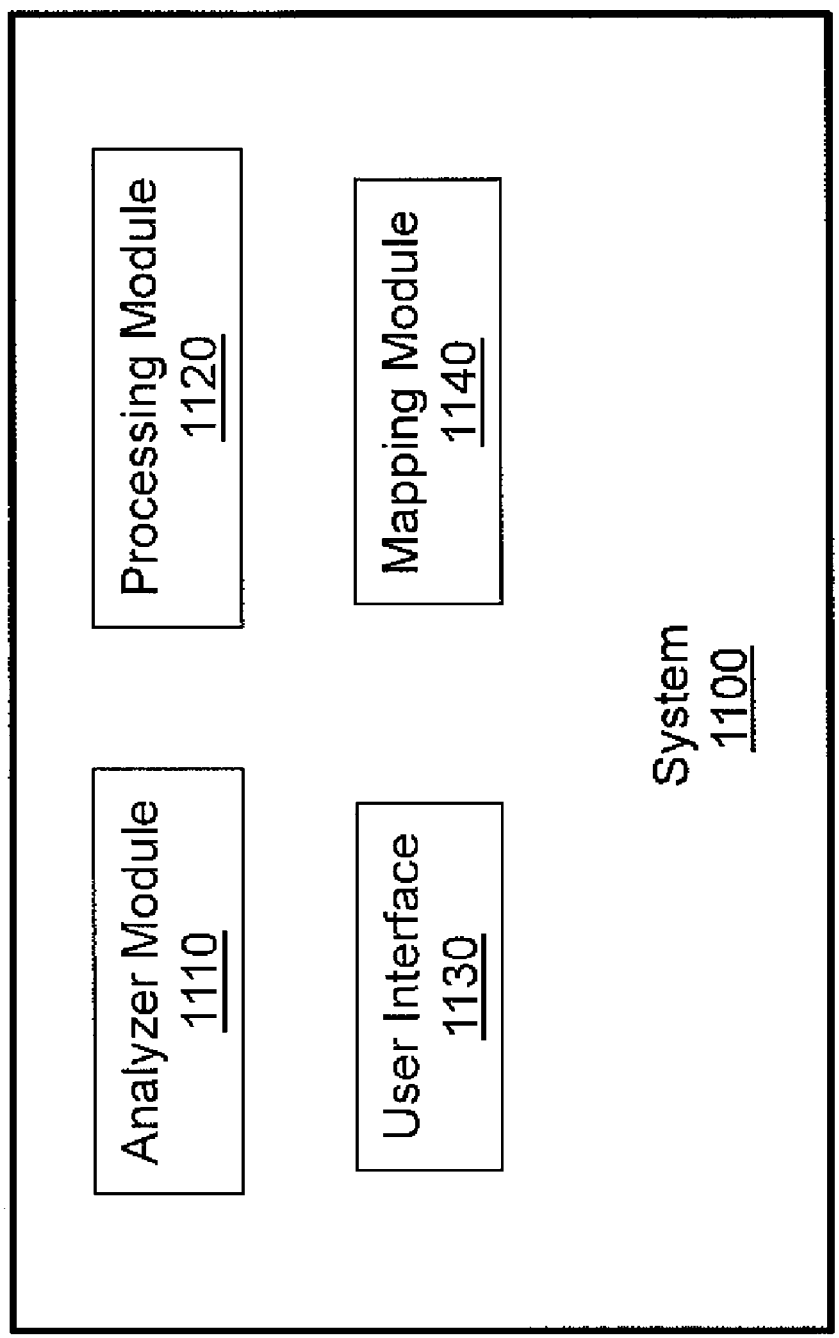
FIG. 11 illustrates a system for performing a method for organizing data addresses within a virtual address space according to another embodiment of the invention.

FIG. 11 illustrates a system 1100 for organizing data addresses within a virtual address space according to an embodiment of the invention. An analyzer module 1110 is provided to monitor data access requests to a secondary storage module and identify data addresses in the secondary storage module having similar properties. A processing module 1120 creates multi-dimensional clusters (e.g., two-dimensional convex hull cluster, ellipsoid cluster, three-dimensional convex hull cluster) in the virtual address space based on the monitoring to group the data addresses having similar properties. The processing module 1120 also creates a memory page from a multi-dimensional cluster, including creating a cross-sectional partition from the multi-dimensional cluster. In at least one embodiment, the processing module 1120 identifies a major axis in the multi-dimensional cluster, wherein the cross-sectional partition is parallel to the major axis. A user interface 1130 sends a request for a data object in the secondary storage module to the processing module 1120; and, a data address corresponding to the requested data object is identified via a mapping module 1140. The mapping module 1140 maps the identified data address to the multi-dimensional cluster and/or the memory page; and, the processing module 1120 transfers the memory page to a data cache in primary storage. Additionally, the processing module 1120 receives updated monitoring of the data access requests from the analyzer module 1110, un-clusters the data addresses, and re-clusters the data addresses based on the updated monitoring of the data access requests.

In another embodiment where networked storage or networked virtualized storage is utilized, such as in the case of a cloud storage infrastructure, at least one of the cloud servers identifies a data address corresponding to the requested data object. The data address is mapped to the multi-dimensional cluster and/or the memory page residing in at least one of the networked storage or a networked virtualized storage, as in case of a cloud storage infrastructure. The memory page is transferred to a data cache in primary storage via at least one of the cloud servers. In at least one embodiment of the invention, updated monitoring of the data access requests is received. The data addresses are un-clustered and re-clustered based on the updated monitoring of the data access requests.

In a hierarchic memory, the data at the lowest level can be stored in a single location or in a distributed environment, where the several storage spaces are connected over the network. As used herein, the term "connected" includes operationally connected, logically connected, in communication with, physically connected, engaged, coupled, contacts, linked, affixed, and attached. The storage can also be done in a cloud environment where the application at the top most level of the hierarchy is ambivalent of where the data is stored at the lowest level of the hierarchy. Cloud storage is a model of networked online storage where data is stored on virtualized pools of storage which are generally hosted by third parties. Hosting companies operate large data centers; and people who require their data to be hosted buy or lease storage capacity from them and use it for their storage needs. The data center operators, in the background, virtualize the resources according to the requirements of the customer and expose them as storage pools, which the customers can themselves use to store files or data objects. Physically, the resource may span across multiple servers.

Figure 13:
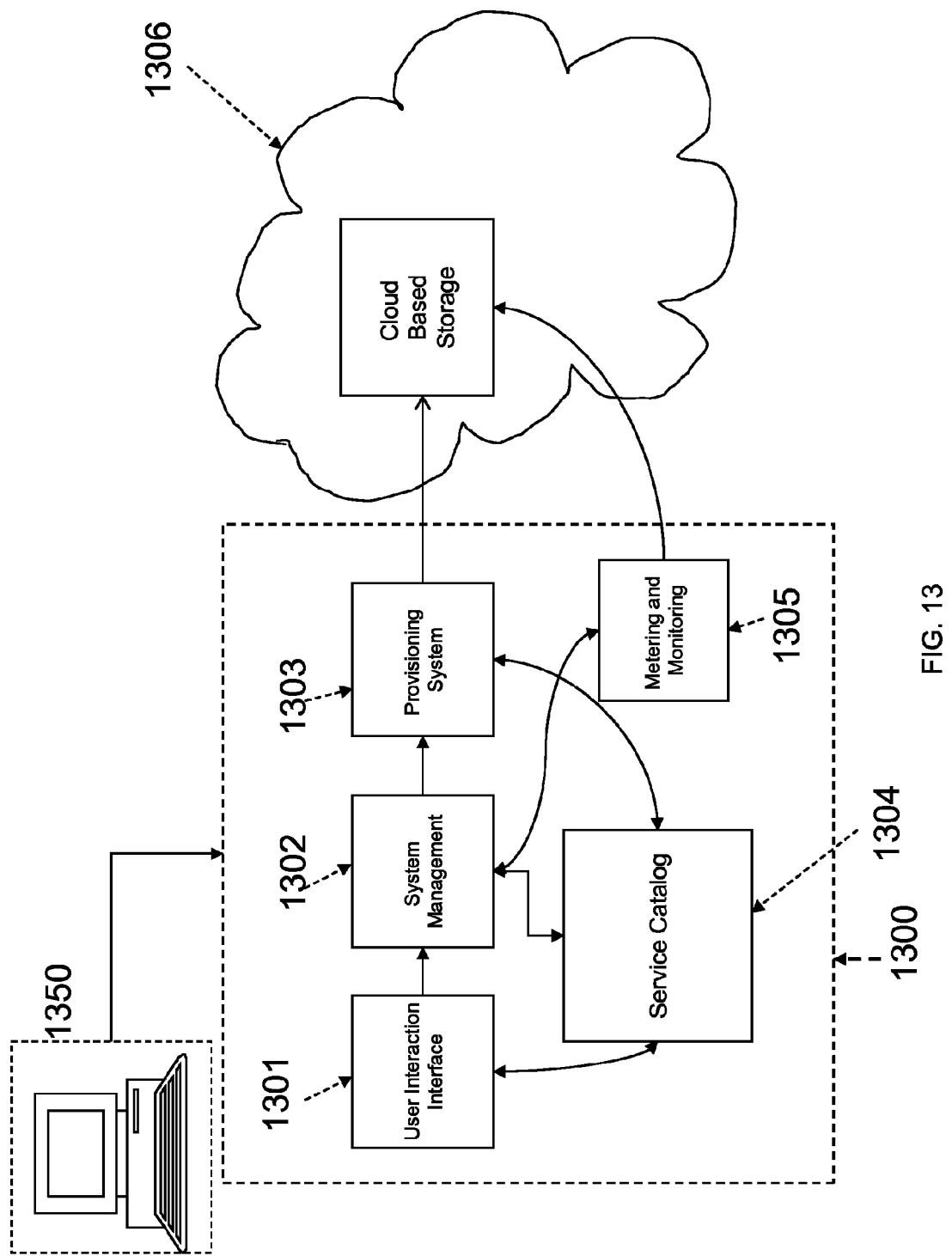
FIG. 13 illustrates the architecture of a cloud storage environment according to an embodiment of the invention.

FIG. 13 illustrates the architecture of a cloud storage environment according to an embodiment of the invention, wherein a user computer 1350 accesses a secondary storage. Cloud server 1300 includes a user interaction interface 1301. In case of a cloud storage 1306, the data may reside in the network and the user is ambivalent to the exact location of the data in the internet. The service of the data storage and access may be provided by a third party and the user may be metered and monitored for the access and usage of cloud storage 1306 via monitoring and metering module 1305. There may be other applications associated with the access of the data such as a cloud system management 1302 and a catalog of applications 1304 that the user may have access to, as well as a provisioning tool 1303 that makes the final connection to the cloud storage 1306. The services catalog 1304 and monitoring and metering module 1305 may also involve secured access to the data storage and maintain and monitor a secured access.

In the case of a cloud environment, several data storage spaces can be connected by one or more cloud storage servers. Several cloud storage servers may also be interconnected to create an inter, or intra-cloud infrastructure. Accessing the relevant subset of data from a networked or cloud storage environment is even more challenging since the access of the data is also severely limited by the speed of the network.

Figure 14:
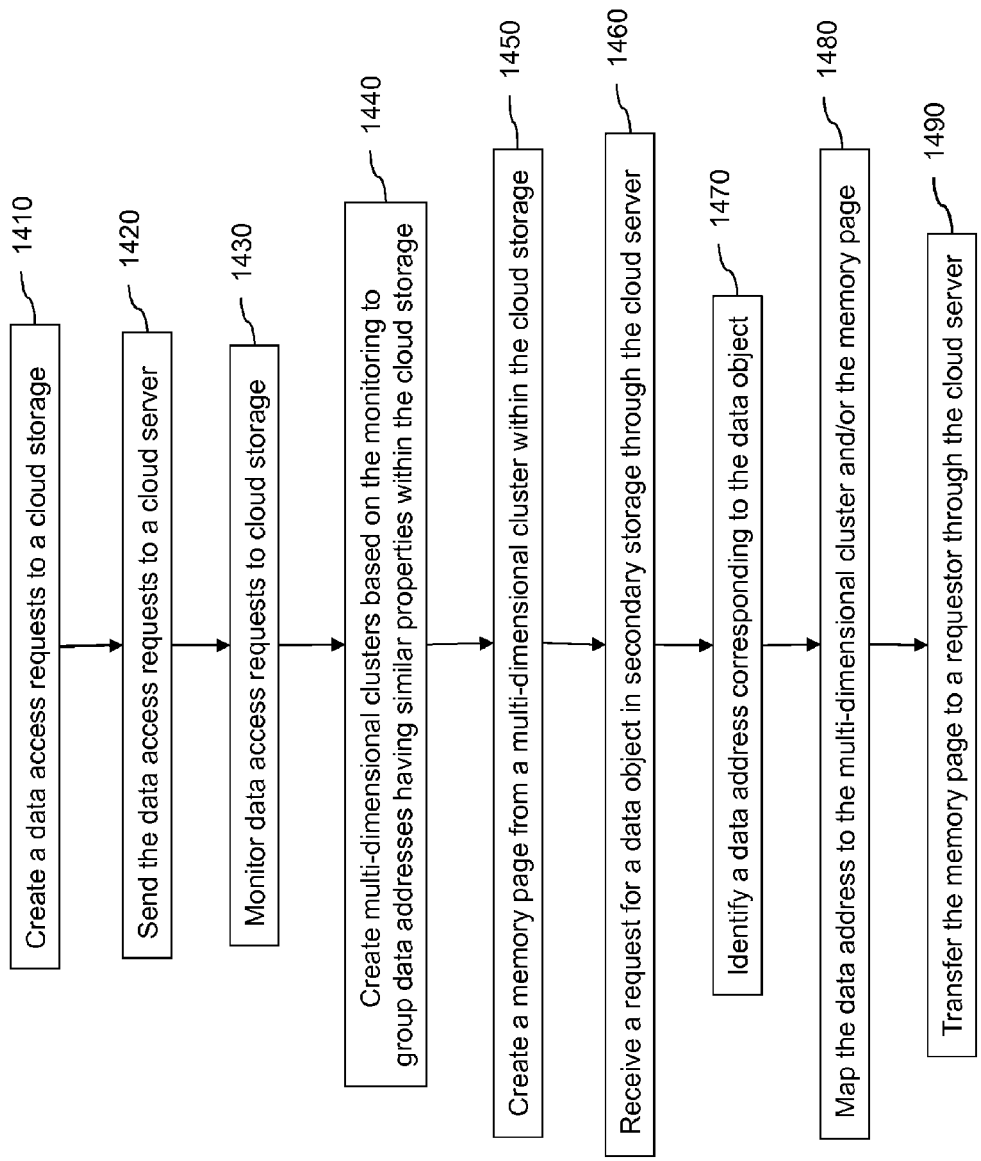
FIG. 14 is a flow diagram illustrating a method of organizing data addresses within a virtual address space within a cloud storage environment according to an embodiment of the invention.

FIG. 14 is a flow diagram illustrating a method for organizing data addresses within a virtual address space residing within a cloud storage environment according to an embodiment of the invention. A request for data access is sent by a user that is not part of the cloud system (1410). A cloud server receives the request (1420). An analyzer module monitors data access requests to a cloud storage module and identifies data addresses in the cloud storage module having similar properties (1430). A processing module creates multi-dimensional clusters (e.g., two-dimensional convex hull cluster, ellipsoid cluster, three-dimensional convex hull cluster) in the virtual address space based on the monitoring to group the data addresses having similar properties within the cloud storage (1440). The processing module also creates a memory page from a multi-dimensional cluster within the cloud storage, including creating a cross-sectional partition from the multi-dimensional cluster (1450). In at least one embodiment, the processing module identifies a major axis in the multi-dimensional cluster, wherein the cross-sectional partition is parallel to the major axis.

A user interface sends a request for a data object in the secondary storage module through the cloud server, which is received by the processing module (1460). A data address corresponding to the requested data object is identified via a mapping module (1470). The mapping module maps the identified data address to the multi-dimensional cluster and/or the memory page (1480); and, the processing module transfers the memory page to the requesting application through the cloud server (1490). In at least one embodiment, the processing module receives updated monitoring of the data access requests from the analyzer module, un-clusters the data addresses, and re-clusters the data addresses based on the updated monitoring of the data access requests.

Figure 15:
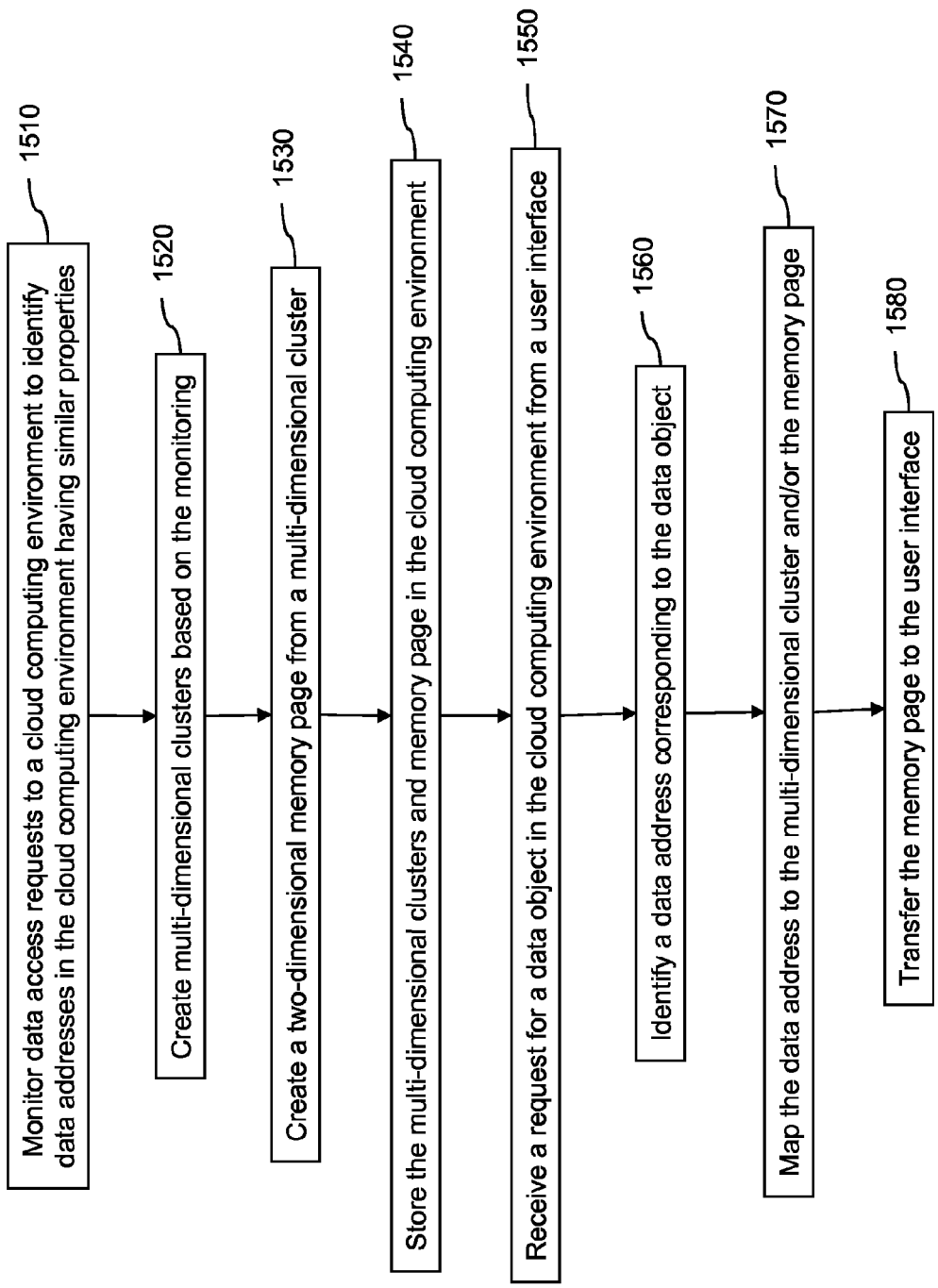
FIG. 15 is a flow diagram illustrating a method for organizing data addresses within a virtual address space to reduce the number of data fetches to a cloud computing environment according to an embodiment of the invention.

FIG. 15 is a flow diagram illustrating a method for organizing data addresses within a virtual address space to reduce the number of data fetches to a cloud computing environment according to an embodiment of the invention. Data access requests to a cloud computing environment are monitored (1510), wherein one or more cloud servers identify data addresses in the cloud computing environment having similar properties (e.g., similar locations and/or similar access frequency).

Multi-dimensional clusters are created in a virtual address space based on the monitoring to group the data addresses having similar properties (1520). The multi-dimensional clusters include a two-dimensional convex hull cluster, an ellipsoid cluster, and/or a three-dimensional convex hull cluster. The major axis of a multi-dimensional cluster is identified by identifying the longest diameter of the multi-dimensional cluster.

A two-dimensional memory page is created from the multi-dimensional cluster (1530) by creating a cross-sectional partition from the multi-dimensional cluster. In at least one embodiment, the cross-sectional partition is parallel to the major axis of the multi-dimensional cluster, which increases the number of data addresses in the memory page. The multi-dimensional clusters and memory page are stored in the cloud computing environment (1540).

A request for a data object in the cloud computing environment is received from a user interface (1550); and, a data address corresponding to the data object is identified (1560). The data address is mapped to the multi-dimensional cluster and/or the memory page (1570). The memory page is transferred to the user interface (1580). In at least one embodiment, the memory page is also transferred to the data cache via one or more cloud servers. Updated monitoring of the data access requests is received; and, the data addresses are un-clustering and re-clustering based on the updated monitoring.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 12:
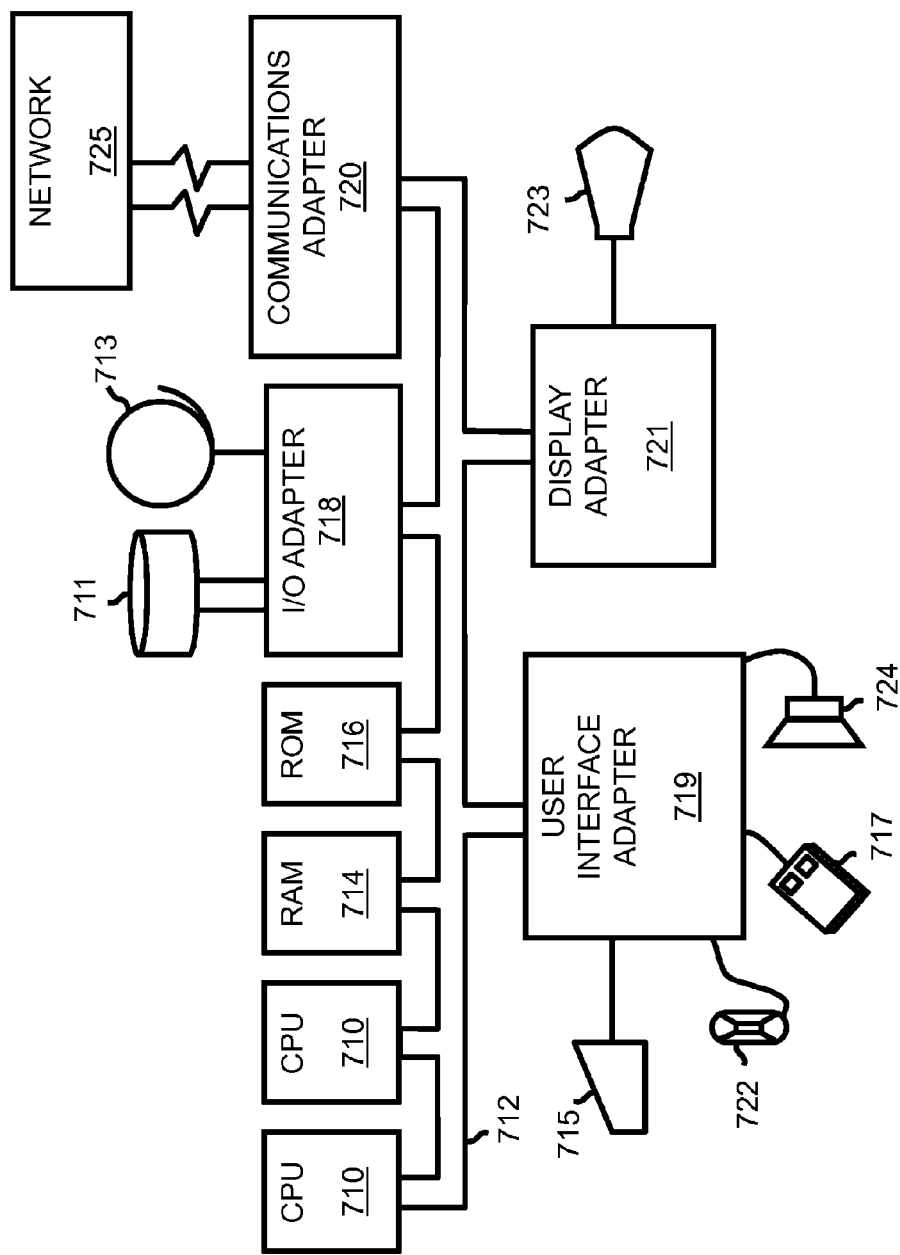
FIG. 12 illustrates a computer program product according to an embodiment of the invention.

Referring now to FIG. 12, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 710. The CPUs 710 are interconnected via system bus 712 to various devices such as a random access memory (RAM) 174, read-only memory (ROM) 716, and an input/output (I/O) adapter 718. The I/O adapter 718 can connect to peripheral devices, such as disk units 711 and tape drives 713, or other program storage devices that are readable by the system. The system can read the inventive instructions on the program storage devices and follow these instructions to execute the methodology of at least one embodiment of the invention. The system further includes a user interface adapter 719 that connects a keyboard 715, mouse 717, speaker 724, microphone 722, and/or other user interface devices such as a touch screen device (not shown) to the bus 712 to gather user input. Additionally, a communication adapter 720 connects the bus 712 to a data processing network 725, and a display adapter 721 connects the bus 712 to a display device 723 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 16:
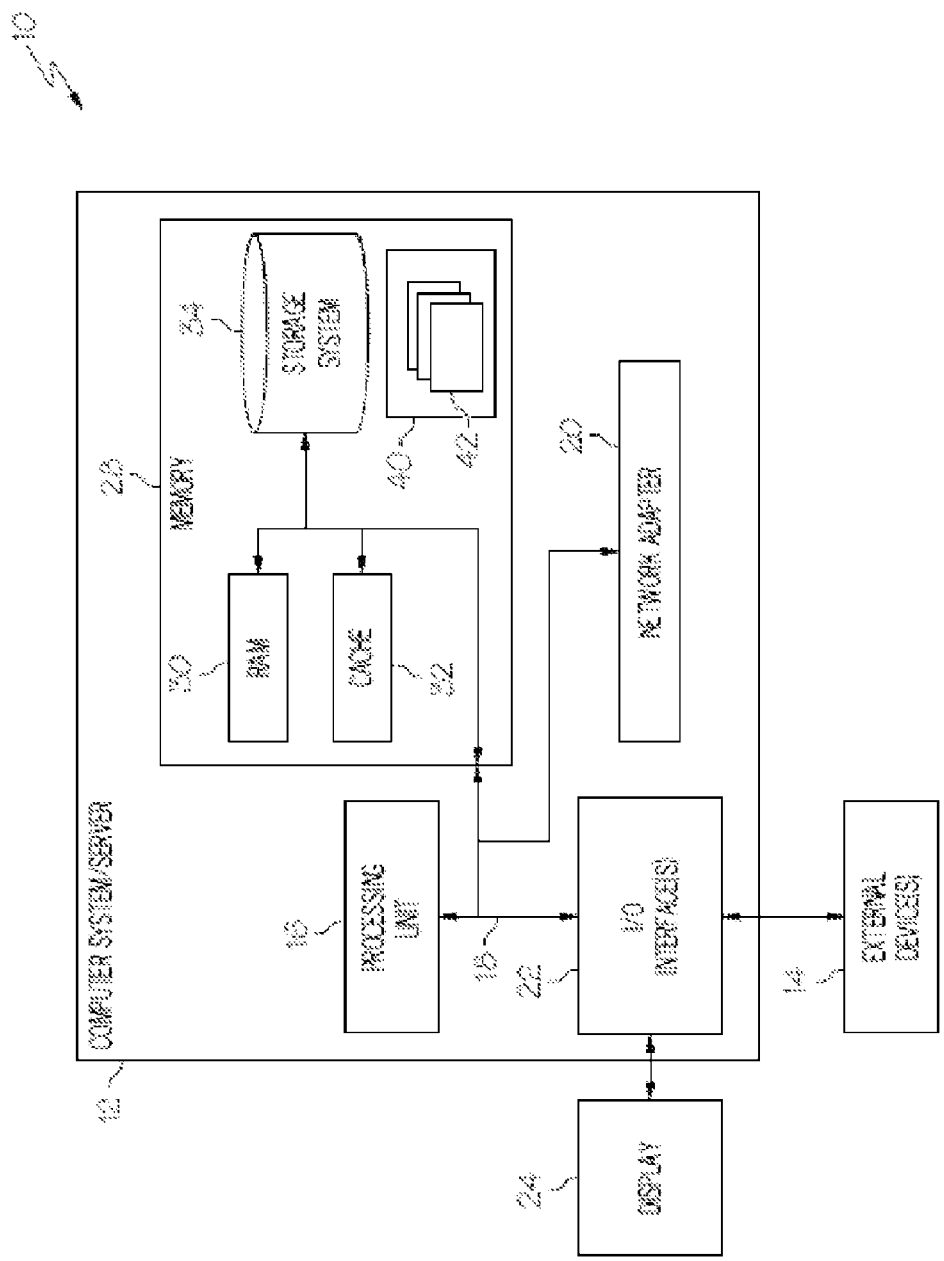
FIG. 16 depicts a cloud computing node according to an embodiment of the present invention.

Referring now to FIG. 16, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 17:
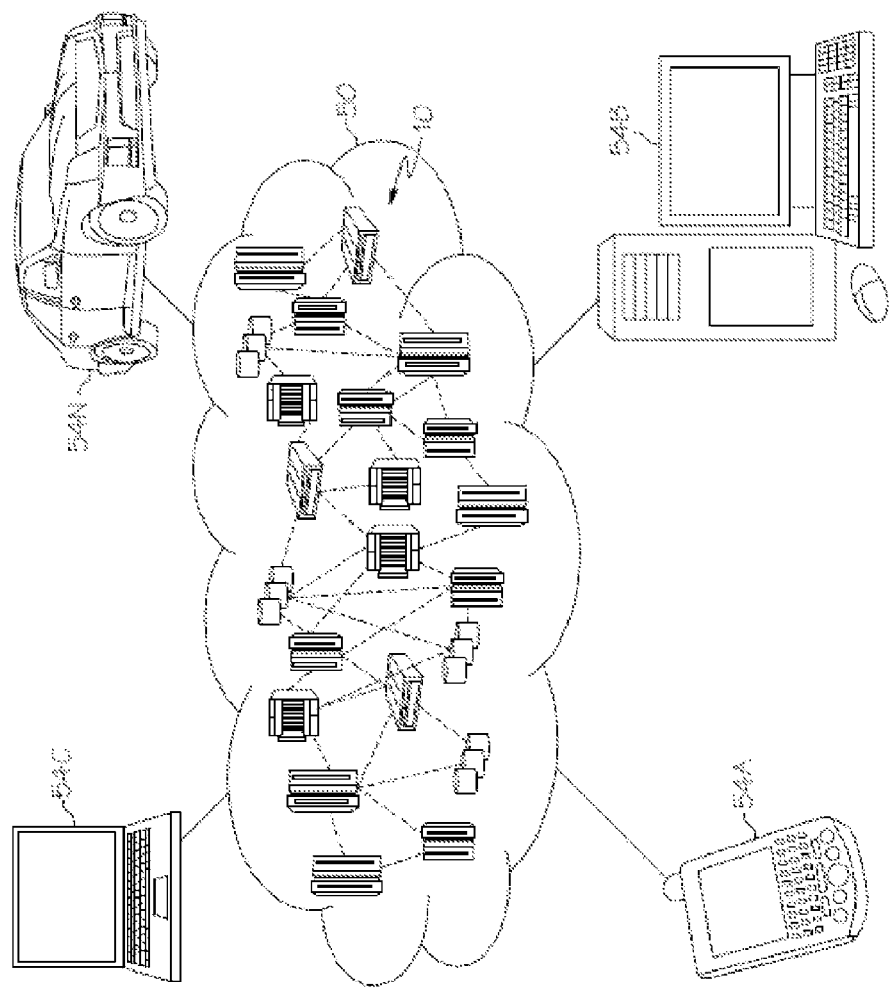
FIG. 17 depicts a cloud computing environment according to an embodiment of the present invention.

Referring now to FIG. 17, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 17 are intended to be illustrative only and that computing nodes 10 and cloud computing environment 50 can communicate with any type of computerized device over any type of network and/or network addressable connection (e.g., using a web browser).

Figure 18:
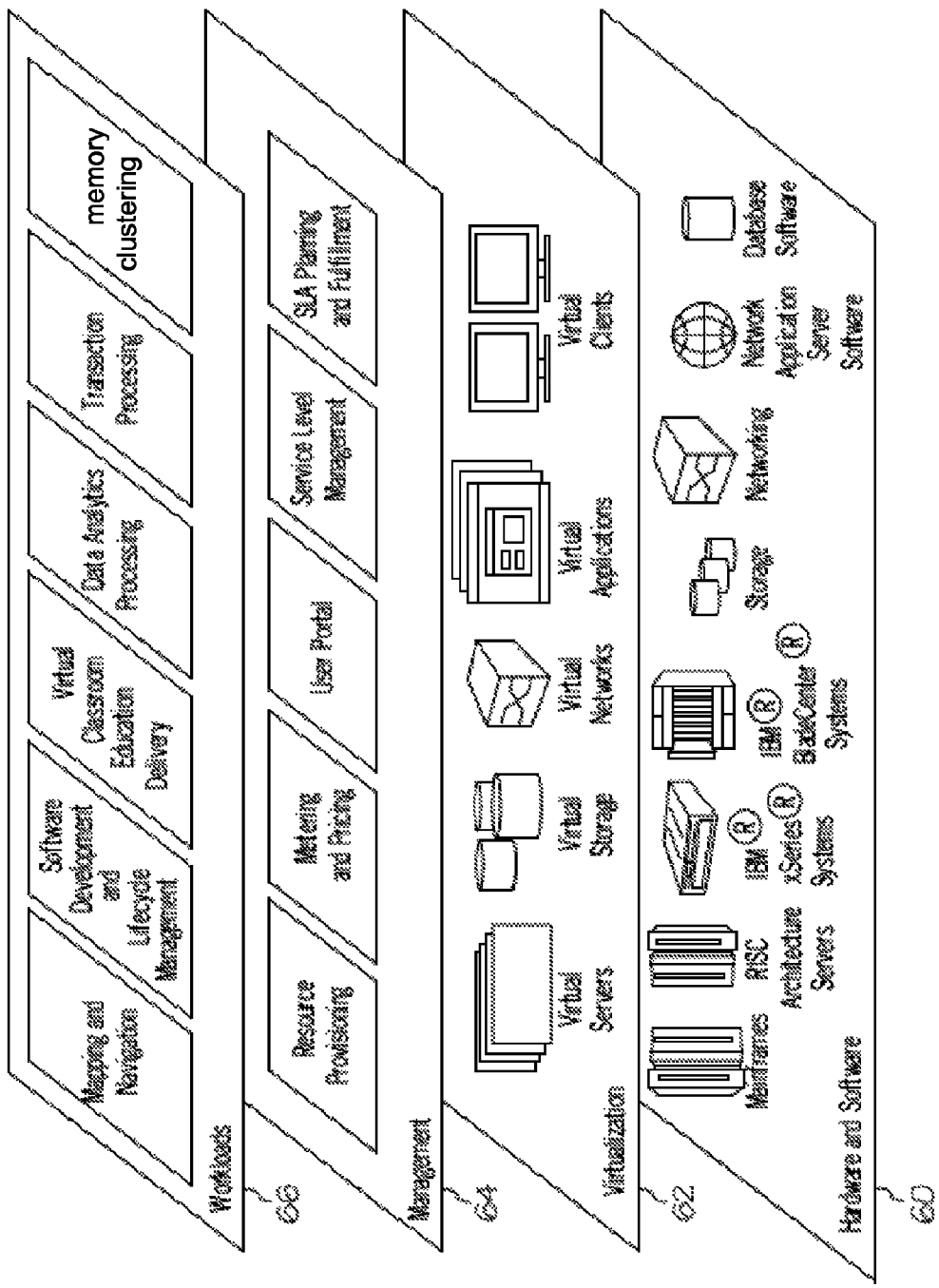
FIG. 18 depicts abstraction model layers according to an embodiment of the present invention.

Referring now to FIG. 18, a set of functional abstraction layers provided by cloud computing environment 50 (FIG. 17) is shown. It should be understood in advance that the components, layers, and functions shown in FIG. 18 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and effective memory clustering to minimize page faults and optimize memory utilization.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   monitoring data access requests to a cloud computing environment, said monitoring including identifying data addresses in the cloud computing environment having similar properties;

creating multi-dimensional clusters with a processing module, the multi-dimensional clusters being created based on said monitoring to group the data addresses having similar properties;
creating a memory page with the processing module, the memory page being created from a multi-dimensional cluster of the multi-dimensional clusters, said creating of the memory page including creating a cross-sectional partition from the multi-dimensional cluster;
storing the multi-dimensional clusters and the memory page in the cloud computing environment;
receiving a request from a user interface, the request including a request for a data object in the cloud computing environment;
identifying a data address corresponding to the data object;
mapping the data address to at least one of the multi-dimensional cluster and the memory page; and
transferring the memory page to the user interface.

2. The method according to claim 1, wherein the data addresses in the cloud computing environment having similar properties are identified with at least one cloud server.

3. The method according to claim 1, wherein the memory page is transferred to the user interface with at least one cloud server.

4. The method according to claim 1, wherein said identifying of the data addresses in the cloud computing environment having similar properties includes identifying data addresses having at least one of similar locations and similar access frequency.

5. The method according to claim 1, wherein said creating of the multi-dimensional clusters includes creating multi-dimensional clusters in a virtual address space.

6. The method according to claim 1, wherein said creating of the multi-dimensional clusters includes creating at least one of a two-dimensional convex hull cluster, an ellipsoid cluster, and a three-dimensional convex hull cluster.

7. The method according to claim 1, further including, prior to said creating of the memory page, identifying a major axis in the multi-dimensional cluster, wherein the cross-sectional partition is parallel to the major axis.

8. The method according to claim 7, wherein said identifying of the major axis includes identifying a longest diameter of the multi-dimensional cluster.

9. The method according to claim 1, wherein said creating of the memory page includes creating a two-dimensional memory page.

10. The method according to claim 1, wherein said creating a cross-sectional partition from the multi-dimensional cluster increases a number of data addresses in the memory page.

11. The method according to claim 1, further including transferring the memory page to a data cache in primary storage.

12. The method according to claim 1, further including:
receiving updated monitoring of the data access requests;
un-clustering the data addresses; and
re-clustering the data addresses based on the updated monitoring of the data access requests.

13. A method for organizing data addresses within a virtual address space to reduce the number of data fetches to a cloud computing environment, said method including:
monitoring data access requests to the cloud computing environment via an analyzer module, said monitoring including identifying data addresses in the cloud computing environment having similar properties;
creating multi-dimensional clusters in the virtual address space via a processing module, said creating of the multi-dimensional clusters based on said monitoring to group the data addresses having similar properties;
creating a memory page from a multi-dimensional cluster of the multi-dimensional clusters with the processing module, said creating of the memory page including creating a cross-sectional partition from the multi-dimensional cluster;
storing the multi-dimensional clusters and the memory page in the cloud computing environment;
receiving a request from a user interface for a data object in the cloud computing environment;
identifying a data address corresponding to the data object in the cloud computing environment via a mapping module;
mapping the data address to at least one of the multi-dimensional cluster and the memory page via the mapping module; and
transferring the memory page to a data cache in primary storage.

14. The method according to claim 13, wherein said identifying of the data addresses in the cloud computing environment having similar properties includes identifying data addresses having at least one of similar locations and similar access frequency.

15. The method according to claim 13, wherein said creating of the multi-dimensional clusters includes creating at least one of a two-dimensional convex hull cluster, an ellipsoid cluster, and a three-dimensional convex hull cluster.

16. The method according to claim 13, further including, prior to said creating of the memory page, identifying a major axis in the multi-dimensional cluster, wherein the cross-sectional partition is parallel to the major axis.

17. The method according to claim 16, wherein said identifying of the major axis includes identifying a longest diameter of the multi-dimensional cluster with the processing module.

18. The method according to claim 13, wherein said creating of the memory page includes creating a two-dimensional memory page.

19. The method according to claim 13, wherein said creating of the cross-sectional partition from the multi-dimensional cluster increases a number of data addresses in the memory page.

20. The method according to claim 13, further including:
receiving updated monitoring of the data access requests;
un-clustering the data addresses; and
re-clustering the data addresses based on the updated monitoring of the data access requests.

21. A system, including:
an analyzer module for monitoring data access requests to a cloud computing environment and identifying data addresses in said cloud computing environment having similar properties;
a processing module connected to said analyzer module, said processor module
creates multi-dimensional clusters in said virtual address space based on the monitoring of said analyzer module to group the data addresses having similar properties,
creates a memory page from a multi-dimensional cluster of said multi-dimensional clusters, including creating a cross-sectional partition from said multi-dimensional cluster, and
transfers said memory page to a data cache in primary storage;

an interface connected to said processing module, said interface receives a request for a data object in said cloud computing environment and sends the request to said processing module; and a mapping module connected to said processing module, said mapping module identifies a data address corresponding to said data object in said cloud computing environment and maps the data address to at least one of said multi-dimensional cluster and said memory page.

22. The system according to claim 21, wherein said multi-dimensional clusters include at least one of a two-dimensional convex hull cluster, an ellipsoid cluster, and a three-dimensional convex hull cluster.

23. The system according to claim 21, wherein said processing module identifies a major axis in said multi-dimensional cluster, and wherein said cross-sectional partition is parallel to said major axis.

24. The system according to claim 21, wherein said processing module receives updated monitoring of said data access requests from said analyzer module;

un-clusters the data addresses; and re-clusters the data addresses based on said updated monitoring of said data access requests from said analyzer module.

25. A computer program product for performing a method for organizing data addresses within a virtual address space to reduce the number of data fetches to a cloud computing environment, said computer program product including:

first program instructions to monitor data access requests to the cloud computing environment and identify data addresses in the cloud computing environment having similar properties;

second program instructions to create multi-dimensional clusters in the virtual address space based on said monitoring to group the data addresses having similar properties;

third program instructions to create a memory page from a multi-dimensional cluster of the multi-dimensional clusters and create a cross-sectional partition from the multi-dimensional cluster;

fourth program instructions to store the multi-dimensional clusters and the memory page in the cloud computing environment;

fifth program instructions to receive a request for a data object in the cloud computing environment;

sixth program instructions to identify a data address corresponding to the data object;

seventh program instructions to map the data address to at least one of the multi-dimensional cluster and the memory page;

eighth program instructions to transfer the memory page to a data cache in primary storage; and a computer readable medium, said first program instructions, said second program instructions, said third program instructions, said fourth program instructions, said fifth program instructions, said sixth program instructions, said seventh program instructions, and said eighth program instructions are stored on said computer readable media.

\* \* \* \* \*